(Model.)
H. A. GOLL.
SWINGING ANGULAR VALVE.
No. 461,206. Patented Oct. 13, 1891.
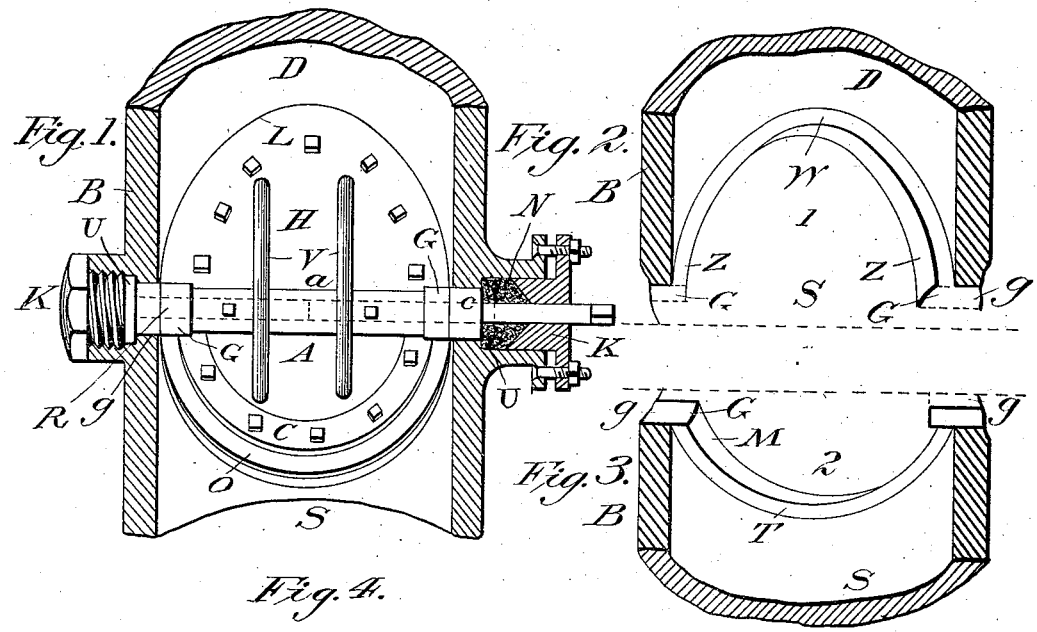
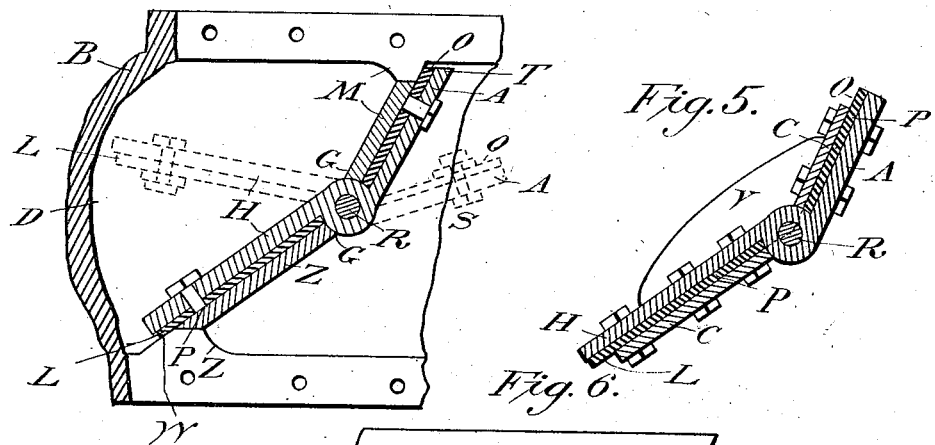
Witnesses:
William H. Goll.
Wm. H. Thornlow.
Inventor:
Henry A. Goll.

UNITED STATES PATENT OFFICE.

HENRY A. GOLL, OF CHICAGO, ILLINOIS.

SWINGING ANGULAR VALVE.

SPECIFICATION forming part of Letters Patent No. 461,206, dated October 13, 1891.

Application filed April 1, 1889. Serial No. 305,645. (Model.)

*To all whom it may concern:*

Be it known that I, HENRY A. GOLL, a citizen of the United States, residing at No. 338 West Van Buren street, in the city of Chicago, in the county of Cook and State of Illinois, have invented a new and useful Improvement for Angular Throttle-Valves, of which the following is a specification.

My invention is a valve-pipe or valve-chest having inner projections which are provided with parts of the bearings for the valve-shaft. These projections are further provided with seats which meet against the bearings and face in opposite directions for valves such as described. According to the construction and arrangement of the seats on these projections the shape, form, and area of the opening in the valve-pipe is produced, which, after hanging the throttle-valve in the pipe by means of a valve-shaft, and said shaft resting with its bearings in the mentioned parts of bearings on the projections, constitute the passages in said pipe.

My invention consists in supplying the projections in the valve-pipe with flat seats which meet against the bearings and face in a slanting opposite direction; further, in supplying the wings of angular throttle-valves with flat seats that meet against the bearings and correspond with the seats on the projections in such a manner that the seats on the valve bear fluid-tight against the seats on the projections and prevent all escape of fluids of any kind when the valve has closed the passages.

My invention further consists in the arrangements of the seats on the projections. The seats on these projections can be arranged in such a manner that the valve, when hung in the pipe by means of the valve-shaft hereinafter described, and fitted to the seats on the projections, the passages being of unequal area, &c., fluids of any kind acting toward the valve cause the valve to be automatic, a non-return valve permitting fluids to go through the pipe only in one direction—S toward D, &c. The seats on these projections can further be arranged in such a manner that the valve, when hung in the pipe, &c., as mentioned above, ceases to be a non-return valve. The valve is then controlled by means of the valve-shaft from the outside of the pipe at will and the valve controls the passages and the fluids. The seats being arranged as hereinafter described, the passages being closed by means of the valve, &c., the seats on the projections forming joints with the seats on the valve, the pressure-area on the seated sides of the wings is reduced by as much as the area of the seats on these projections, and a pressure of fluids coming from either end of the pipe causes the valve to attach itself firmer to the seats on the projections, the passages being closed, and fluids of any kind are prevented from going in either direction—S toward D or D toward S—as the pressure-area of the non-seated sides on the wings is larger than the pressure-area of the seated sides. In opening the passages by means of the valves, &c., it is only required to overcome the pressure on the area of the seats on the projection. The passages, when opened by means of the valve, &c., remain open, as then the pressure-area is the same toward the valve in every direction, and fluids of any kind can go in either direction—D toward S or S toward D, &c.

In order to give a better understanding of my invention, I have marked corresponding parts with similar letters, and of which I will now give a detailed description, reference being had to the accompanying drawings, and to the letters of reference marked thereon, making a part of this specification, in which—

Figure 1 is a front view of an angular valve hung diametrically in a longitudinal section of a part of a cylindrical pipe having inner projections, also showing the bearings for the valve-shaft, glands or screws, stuffing-boxes, packing, as ordinarily in use, applied to the wings of the valve held against the seats, &c., by means of cover-plates, bolts, or screws, &c. Figs. 2 and 3 are sections of cylindrical pipes or chests having inner projections, showing seats on the projections, bearings, passages, &c. Fig. 4 is a sectional side view of an angular valve in a longitudinal section of a part of a cylindrical pipe having inner projections, showing seats on the projections, bearings, the valve hung diametrically in the section of pipe, the valve in solid lines when the valve has closed the passages, in dotted lines when the valve has opened the passages, &c. Fig. 5 is a side view of an angular valve, showing braces with which the valve's wings are strengthened should they require it, &c. Fig. 6 is a cross-section of the valve in position slightly modified by having its leaves more nearly in one plane.

B, Figs. 1, 2, 3, and 4, are sections of a cylindrical pipe or valve-chest having internal meeting projections or ribs M and Z. The pipe and the ribs are provided at the junctions of the ribs with the bearings G g for the journals on the valve-shaft. The planes of these ribs M and Z, on which are the seats hereinafter described, face in opposite directions and are slanting with the sides (upper and lower, Fig. 4) of the pipe. The object of having the planes on these ribs slanting is that the ribs may have the bearings G for the purpose hereinafter mentioned, and that the valve may be enabled to open cylindrical pipe to the fullest extent, so that steam, water, or fluids of any kind may go through the pipe freely and with the least obstruction in the valve-chest. The valve being hung in the pipe, as hereinafter described, in order to prevent steam, water, &c., from going through the pipe and passages, the seats on the valve-wings must be fitted to the seats on the ribs and the journals on the shaft fitted to the bearings in such a manner that the seats on the valve form joints with the seats on the ribs, and likewise the journals on the shaft form joints with the bearings when the valve has closed the passages.

The ribs M and Z are provided with flat seats W and T, likewise with parts of the bearings G. The seats W and T face in opposite directions, meet with the bearings in line with the pivots, and are arranged in planes which are inclined to each other at an obtuse angle adapted to form joints and fit the seats L and O on the valve-wings. The bearings are adapted to form joints and fit the valve-shaft journals when the passages 1 and 2 are closed by means of the valve.

The valve, as shown, is obtuse angled, and has two wings H and A. These are provided with flat seats L and O, meeting with the journals in line with the pivots facing in opposite directions, arranged in planes which are to each other at an obtuse angle, adapted to form joints and fit the seats W and T on the ribs. The valve-shaft journals are adapted to form joints and fit the bearings G g when the pipe is closed by means of the valve. The angular valve is hung in said pipe by means of trunnions or a valve-shaft R in such a manner that the valve with its shaft is enabled to swing. Said shaft has its bearings at the junctions of the ribs, partly in the sides of the pipe g and partly in the pipe on the ribs G, Figs. 2, 3, and 4. In order to place the valve in the pipe the valve and the shaft can be made in sections or the pipe can be made in sections, or both, according to the adaptability.

The valve-shaft R has plates or washers U abutting against the ends of the bearings to prevent the valve from moving sidewise. These are larger than the diameter of the bearings and are held to their places by means of screws or glands K by known methods.

The shaft R, Fig. 1, is extended from e, passes through the washers U, packing N, and gland K far enough, so that a key, wrench, or other means, according to the adaptability, may be applied, with which to control the valve from the outside of the pipe at will.

The braces V are for the purpose of strengthening the valve-wings should they require it.

In using packing such as is ordinarily in use on the valve-wings the valve has cover-plates C, through which pass bolts or screws, by which means the packing P is held against the seats L and O. Said cover-plates must be smaller than the seats L and O on the valve and the seats W and T on the ribs, in order to allow only the packing to be between the seats on the valve and the seats on the ribs when the passages are closed by means of the valve. A pipe or valve-chest having internal meeting-ribs provided with seats and bearings, &c., as herein described, according to the construction and arrangement of the seats W and T, will cause a swinging valve, as described, when hung in said pipe, and the seats on the valve being fitted to the seats on the ribs, and the journals on the shaft to the bearings, either to be an automatic non-return valve, a relief, or a check-valve, easily controlled from the outside of the pipe at will, so as to allow fluids to go or prevent fluids from going in either direction—S toward D or D toward S.

The valve, to open the passages automatically to a stronger suction at one end of the pipe D or to a stronger pressure of fluids of any kind coming from the opposite end of the pipe S and to close the passages by means of its own weight as soon as said suction or pressure has ceased, must swing with its shaft in the bearings freely. The bearings should be about horizontal, the wings must be of unequal weight, and the seats W and T on the ribs must be constructed and arranged in such a manner that when the passages are closed by means of the valve the inner closing edge of the seat W will cause the passage 1 to have a larger area than the area of the passage 2 and the seat T combined.

The ribs M and Z and the seats thereon meet against the valve-shaft. The bearings, as shown on the drawings, are placed diametrically in said pipe B, which is not essential, for in a pipe or valve-chest having the internal meeting ribs, as described, the operation would be the same should the bearings be toward one side of the pipe. It is necessary, however, to construct and arrange the seats, passages, &c., as described. As shown on the drawings, the seats on the ribs are of about an even width. The seat edges are of about an even distance from the inner sides of the pipe. When the valve is fitted to said seats and hung as shown, and the outer closing edges of the seats L and O on the valve are also the outer edges on the valve-wings, said wings will be of unequal length, size, form, and area, and if the wings are of about an even thickness the wings will be also of unequal weight. The passages, the seats, the valve-wings, the valve-shaft, &c., being as described, the valve when hung in said pipe is without any appliances, such as rods, levers, springs, &c.—an automatic non-return valve which will allow steam, water, &c., to go in but one direction—S toward D—will prevent anything from going in the opposite directions—D toward S—whether the pipe is in a slanting, horizontal, or vertical position, unless the valve is prevented from so doing by means applied to the valve-shaft, as mentioned, &c. A stronger suction at D than there is at S, or a stronger pressure of steam, water, or fluids of any kind coming from S than there is at D toward the wings H and A causes the wing H with its increased area to turn toward D and the center of the pipe. The wing A, being overpowered by the wing H, will turn toward S and the center of the pipe, thus opening the two passages 1 and 2, and the fluids will pass through those passages 1 and 2 and finally out at D. As soon as the mentioned suction or pressure has ceased the valve will again close those passages 1 and 2 by means of its own weight, seats, &c., for the purpose mentioned above.

To control the valve from the outside of the pipe, that steam, water, &c., may go or be prevented from going in either direction— D toward S or S toward D—at will, by means of the valve-shaft, &c., the inner closing edge of the seat W must be constructed and arranged in such a manner that the passage 1 has a smaller area than the area of the passage 2 and the seat T combined, and the inner closing edge of the seat T must be constructed and arranged in such a manner that the passage 2 has a smaller area than the area of the passage 1 and the seat W combined, as shown in Fig. 6.

The pipes, the seats, the passages, &c., being constructed as described, the valve being fitted to said seats and hung in the pipe by means of the valve-shaft, which in such a case can be in any position, subject to the conditions above stated, and the passages being closed by means of the valve, a pressure from either end of the pipe D or S of steam, water, &c., would cause the valve to attach itself firmer to the seats W and T and prevent steam, water, &c., from going through the passages, for there is superior force exerted upon the non-seated sides of the valve-wings, corresponding to the area of the seats W and T on the ribs M and Z. This is also the area which only is required to be overcome to relieve the valve from the seats W and T and to open the passages 1 and 2. When the passages are open, steam, water, &c., can go in either direction—toward S or S D toward D—as then the pressure on both sides of the wings is the same, no matter what position the valve and pipe is in.

Having fully described my invention, what I claim, and desire to secure by Letters Patent, is—

1. The combination, with a pipe or valve-chest provided with internal meeting ribs M and Z, which have formed thereon the valve-seats W and T, facing in opposite directions and arranged in planes which are inclined to each other at an obtuse angle, and with the bearings G g, arranged at the junctions of the ribs, of a valve provided with trunnions adapted to fit said bearings and with seating-surfaces facing in opposite directions and arranged in planes which are inclined to each other at an obtuse angle and adapted to fit said valve-seats and the passages, substantially as described, and for the purposes specified.

2. A pipe or valve-chest having internal meeting ribs M and Z, having formed thereon the valve-seats W and T, these facing in opposite directions and arranged in planes which are inclined to each other at an obtuse angle and which meet the bearings, and the bearings G g, arranged at the junctions of the ribs, substantially as described, and for the purposes specified.

3. A valve provided with pivotal or journaled supports and wings having seating-surfaces upon opposite sides thereof, said seating-surfaces facing in opposite directions and arranged in planes which are inclined to each other at an obtuse angle and which meet the bearings, substantially as described, and for the purposes specified.

4. A pipe or valve-chest provided with internal meeting ribs M and Z, which have formed thereon the valve-seats W and T, facing in opposite directions and arranged in planes which are inclined to each other at an obtuse angle, and with the bearings G g, arranged at the junctions of the ribs, in combination with a valve mounted in said bearings and adapted to seat against said seats, and the passages 1 and 2, substantially as described, and for the purposes specified.

5. The combination, with a pipe or valve-chest provided with internal meeting ribs M and Z, which have formed thereon the valve-seats W and T, facing in opposite directions and arranged in planes which are inclined to each other at an obtuse angle, and with the bearings G g, arranged at the junctions of the ribs, and with an external stuffing-box in line with said bearings, of a valve provided with trunnions or a valve-shaft adapted to fit said bearings, and with a spindle passing through said stuffing-box, whereby it may be operated from the outside, said valve being also provided with seating-surfaces facing in opposite directions and arranged in planes which are inclined to each other at an obtuse angle and adapted to fit said valve-seats, and the passages 1 and 2, substantially as described, and for the purposes specified.

6. The combination, with a pipe or valve-chest provided with internal meeting ribs M and Z, which have formed thereon the valve-seats W and T, facing in opposite directions and arranged in planes which are inclined to each other at an obtuse angle, and with the bearings G g, arranged at the junctions of the ribs, and an external stuffing-box in line with said bearings, of a valve provided with trunnions adapted to fit said bearings and with a spindle passing through said stuffing-box, whereby it may be operated from the outside, said valve being also provided with seating-surfaces facing in opposite directions and arranged in planes which are inclined to each other at an obtuse angle, said seating-surfaces being adapted to fit said valve-seats, the passages 1 and 2, glands or screws K, washers U, packing N, the valve-shaft, and the means of working the valve, substantially as described, and for the purposes specified.

HENRY A. GOLL.

Witnesses:
 WILLIAM H. THORNTON,
 WILLIAM H. GOLL.